Figure 1:
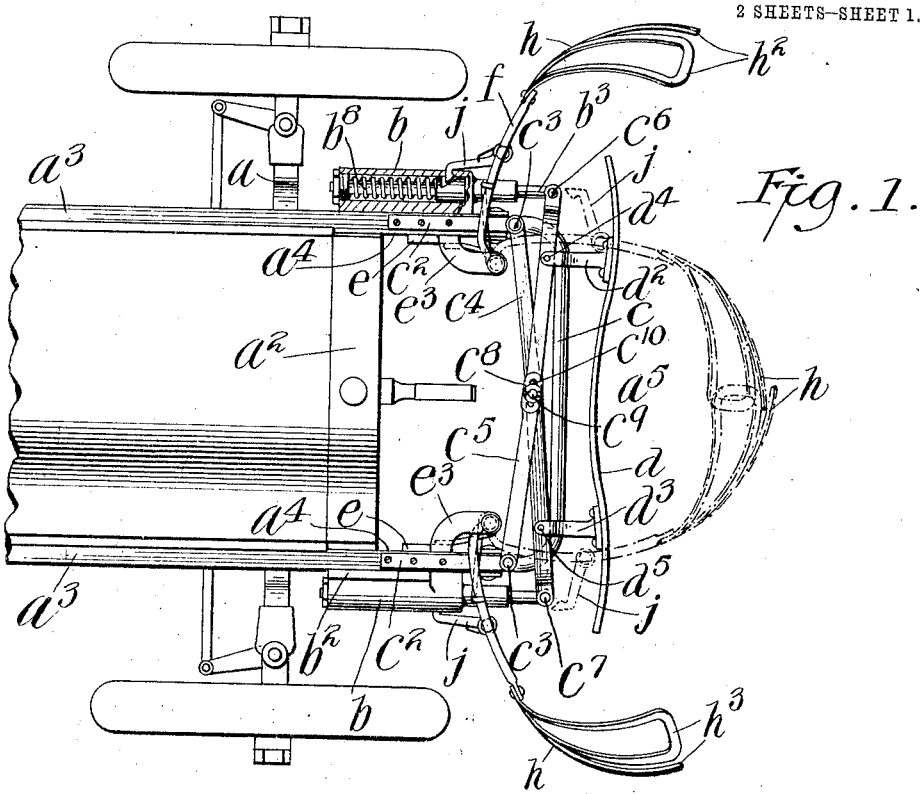

J. CORCOS.
FENDER OR GUARD FOR AUTOMOBILES.
APPLICATION FILED OCT. 17, 1913.

1,100,172.

Patented June 16, 1914.
2 SHEETS—SHEET 1.

Witnesses:
H. E. Thompson
S. Andrews

Inventor
Joseph Corcos
By his Attorneys

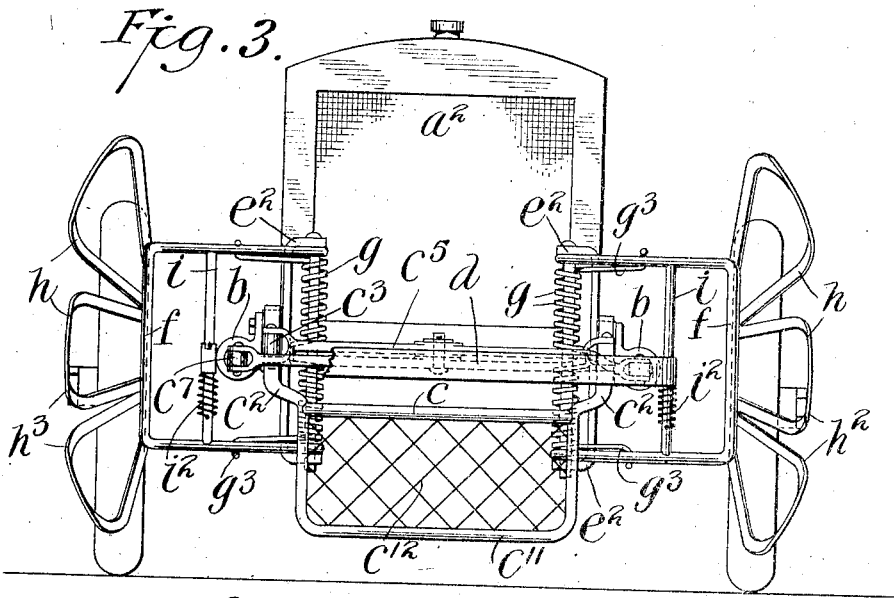
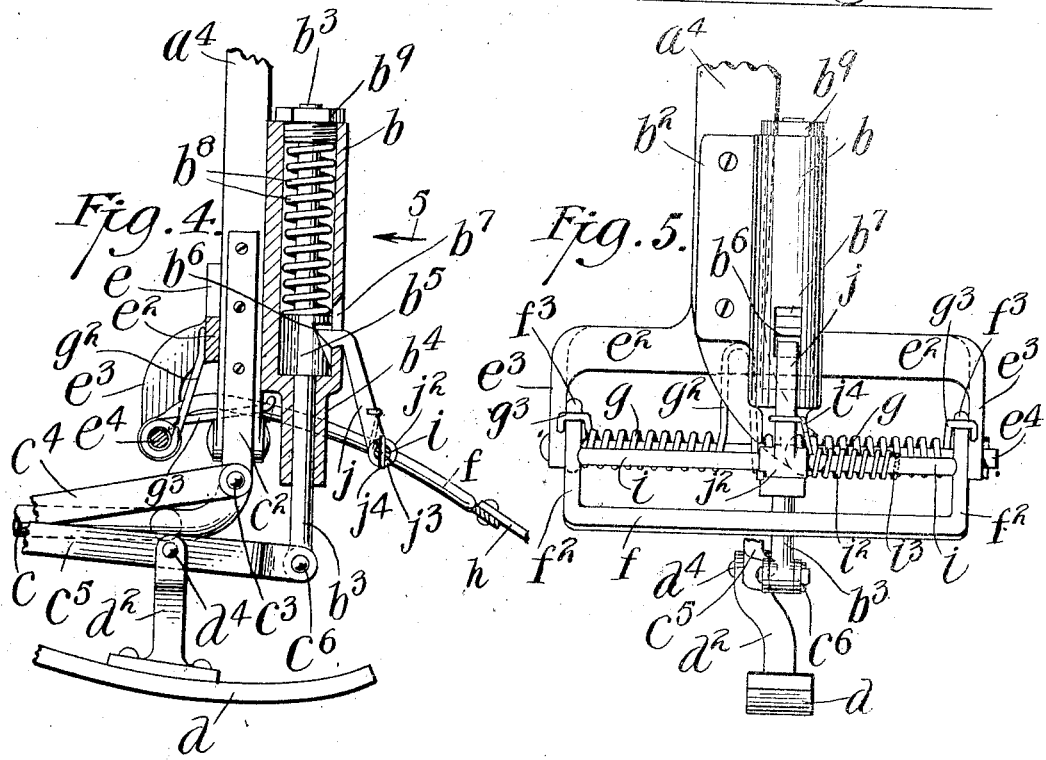

UNITED STATES PATENT OFFICE.

JOSEPH CORCOS, OF BROOKLYN, NEW YORK.

FENDER OR GUARD FOR AUTOMOBILES.

1,100,172.  Specification of Letters Patent.  Patented June 16, 1914.

Application filed October 17, 1913. Serial No. 795,622.

*To all whom it may concern:*

Be it known that I, JOSEPH CORCOS, a citizen of the United States, and residing at Brooklyn, in the county of Kings and State of New York, have invented certain new and useful Improvements in Fenders or Guards for Automobiles, of which the following is a specification, such as will enable those skilled in the art to which it appertains to make and use the same.

This invention relates to fenders or guards for automobiles, and the object thereof is to provide an improved device of this class which may be easily applied to automobiles as now constructed, and which will prevent the serious and sometimes fatal accidents which frequently result from a person being struck by an automobile when in motion; a further object being to provide a device or apparatus of the class specified which will prevent a person struck by an automobile in motion from passing beneath the car or vehicle; a still further object being to provide a fender or guard of the class specified which may also be applied, if desired, to tram way cars, and which is simple in construction and efficient in operation; and with these and other objects in view the invention consists in a device of the class specified, constructed and operating as hereinafter described and claimed.

The invention is fully disclosed in the following specification of which the accompanying drawings form a part, in which the separate parts of my improvement are designated by suitable reference characters in each of the views, and in which:—

Figure 2:
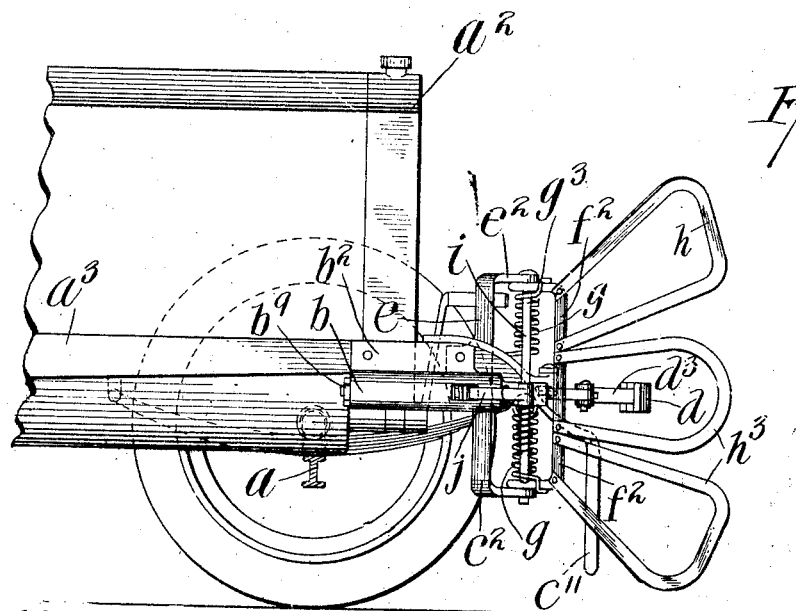

Figure 1 is a plan view of the front part of an automobile or similar power driven vehicle provided with my improved fender or guard, the operative parts being shown in an open position in full lines, as when ready for use, and being indicated in the closed position in dotted lines, and a part being also shown in section;—Fig. 2 a side view of the apparatus as shown in full lines in Fig. 1;—Fig. 3 a front view of the apparatus as shown in full lines in Fig. 1;—Fig. 4 a sectional plan view similar to Fig. 1, but on an enlarged scale and showing only one side portion of the apparatus, and showing the same set for use as shown in full lines in Fig. 1; and Fig. 5 a side view looking in the direction of the arrow 5 of Fig. 4.

In the drawing forming part of this specification, I have shown at $a$ the front axle of an automobile or similar power-driven vehicle, at $a^2$ the radiator thereof, and at $a^3$ the side bars of the chassis or truck frame, and said side bars $a^3$ are provided with forwardly directed members $a^4$ with which my improved fender or guard $a^5$ is connected.

In carrying my invention into effect, I secure to the outer sides of the parts $a^4$ cylinders $b$ having plates $b^2$ bolted or otherwise secured to the parts $a^4$, and passing through said cylinders, in the form of construction shown, are plunger rods $b^3$. The cylinders $b$ are provided with forwardly directed sleeves $b^4$ through which the plunger rods $b^3$ are passed and through which the front end portions of said rods are projected, and said rods are provided within said cylinders with plunger blocks $b^5$ the outer sides of which are provided with cam recesses $b^6$, and the outer walls of the cylinders $b$ are provided with openings $b^7$ which correspond with the recesses $b^6$, and wound on the rear end portions of the rods $b^3$ are spiral springs $b^8$ which bear on the blocks $b^5$ and on nuts $b^9$ screwed into the rear ends of the cylinders $b$, and through which the rear end portions of the rods $b^3$ pass. I also provide a yoke-shaped frame $c$ having backwardly directed side arms $c^2$ which are secured on the parts $a^4$ of the side bars $a^3$ of the chassis or truck frame, and pivoted at $c^3$ to the side arms $c^2$ of the yoke-shaped frame $c$ are levers $c^4$ and $c^5$ which extend in opposite directions transversely of the front of the automobile, and the opposite ends of which are connected respectively with the front ends of the plunger rods $b^3$ at $c^6$ and $c^7$, and said levers $c^4$ and $c^5$ cross each other centrally and are connected at $c^8$ by a pin $c^9$ passed through longitudinal slots $c^{10}$ in said levers. The side arms $c^2$ of the yoke-shaped frame $c$ are curved downwardly and forwardly, as shown in Fig. 3, and the cross head portion of said frame is provided with a supplemental downwardly directed yoke-shaped frame $c^{11}$ having a body portion $c^{12}$ of wire mesh or any other suitable material, and the supplemental frame $c^{11}$ forms a supplemental guard to prevent a person struck by the vehicle in motion, from passing thereunder. I also provide a front buffer $d$ which extends transversely of the front of the vehicle and forwardly of the yoke-shaped frame $c$, and the levers $c^4$ and $c^5$ and to which are secured backwardly directed arms $d^2$ and $d^3$ which are pivoted to the levers $c^4$ and $c^5$ at $d^4$ and $d^5$.

Secured to the inner sides of the forwardly projected parts $a^4$ of the side bars $a^3$ are bracket plates $e$ provided with vertically arranged and yoke-shaped frames $e^2$ having inwardly and forwardly curved side arms $e^3$ through the ends of which are passed vertical shafts $e^4$ on which are mounted yoke-shaped wing frames $f$ having side arms $f^2$, and wound on the shafts $e^4$ are springs $g$ having looped or yoke-shaped members $g^2$ which bear on the yoke-shaped frames $e^2$, and the ends $g^3$ of which are provided with hook-shaped members which engage the side arms $f^2$ of the wing frames $f$.

The wing frames $f$ are provided with wings $h$ which are connected with the vertical cross head portion of said frames, and which, in the form of construction shown, consists of forwardly directed bows or loop-members $a^2$, three of which are shown and which are preferably curved forwardly, as shown, the wing frames $f$ being similarly curved, and mounted between the side arms $f^2$ of the yoke-shaped wing frames $f$ are shafts $i$ on the central portions of which are mounted lock dogs $j$, and wound on the shafts $i$ are springs $i^2$, the ends $i^3$ of which are secured to said shafts, and the other ends $i^4$ of which engage the dogs $j$, and said dogs $j$ are provided with heads $j^2$ through which the shafts $i$ pass and which are provided in one end thereof with transverse recesses $j^3$, and passed through the shafts $i$ are pins $j^4$ which operate in said recesses and which limit the turning movement of said dogs on the shafts $i$.

The wing frames $f$ and the wings $h$ connected therewith are adapted to be held extended, as shown in full lines in Figs. 1 and 3, or to be closed together, as shown in dotted lines in Fig. 1, and when they are swung outwardly or extended, as shown in full lines in Fig. 1, the dogs $j$ pass through the openings $b^7$ in the cylinders $b$ and into the cam recesses $b^6$ in the plunger blocks $b^5$, as clearly shown in Fig. 4, and this is the position said parts occupy when the vehicle is in use and the guard or fender set for operation. If, at this time, a person should be struck by the buffer $d$, the levers $c^4$ and $c^5$, with which said buffer is connected, would force both of the plunger rods $b^3$ inwardly or backwardly and the cam blocks $b^5$ would force the noses or free ends of the dogs $j$ out of the cylinders $b$ and the springs $g$ would at once throw the wing frames $f$ and wings $h$ into the position shown in dotted lines in Fig. 1, and the person so struck would be grasped and held by said wings and would not be run over by the vehicle, or thrown away from, or to one side of the car, as usually results in accidents of this kind, and said person would not be injured.

It will be understood that the operation of the dogs $j$ is indicated in the above described movement, and in order to again set the wings and wing frames $h$ and $f$ in position for use, they must be moved backwardly by hand, or in any other desired manner, and in this operation, the dogs $j$ or the noses thereof will again enter the cylinders $b$, and the plunger blocks $b^5$ of the rods $b^3$ will be in position to be engaged by said dogs, as shown in Figs. 1 and 4, having been again forced forwardly into their normal positions by the springs $b^6$.

From the foregoing description, it will be seen that my improved fender or guard comprises three groups of parts, namely; the downwardly directed supplemental stationary fender or guard member $c^{11}$, the wings $h$ and wing frames $f$, and means for operating said wings and wing frames comprising the buffer $d$, the cylinders $b$, the spring operated plunger bars $b^3$, the connections between the buffer $d$ and said plunger bars, and the spring controlled dogs $j$, and while I have shown and described the levers $c^4$ and $c^5$ as a connecting means between the buffer $d$ and the plunger rods $b^3$, other means may be employed, and changes in and modifications of the construction of the various parts herein shown and described may be made, within the scope of the appended claims, without departing from the spirit of my invention or sacrificing its advantages, and while I have shown and described the pivoted side wings as consisting of the parts $f$ and $h$, it will be understood that these side wings, which constitute the main part of the device or apparatus, may be made in different ways and of various forms, and while I have also shown and described my improved fender or guard as applied only to automobiles, it will be also understood that the same may be applied to tramway cars and other vehicles.

Having fully described my invention what I claim as new and desire to secure by Letters Patent is:—

1. A fender or guard for vehicles comprising wings mounted at the opposite sides of the front of the vehicle, a buffer extending transversely of the front of the vehicle, spring operated plungers mounted at the sides of the vehicle, and in operative connection with said buffer, and spring controlled dogs for engaging said plungers.

2. The combination with the front of a vehicle of a fender or guard comprising side wings, a transversely arranged buffer, spring controlled plungers in operative connection with said buffer, and devices connected with said spring controlled wings for engaging said plungers, said wings being adapted to be normally held in an open position and to be thrown forwardly and closed by pressure on the buffer.

3. A fender or guard for vehicles, comprising cylinders supported at the opposite sides of the front of the vehicle, spring-operated side wings hinged adjacent to said cylinders, spring-operated plungers mounted in said cylinders, dogs connected with said wings and adapted to engage said plungers in said cylinders, levers mounted transversely of the front of the vehicle and connected therewith at one end and at the opposite end with said plungers, said levers being crossed and pivotally connected centrally thereof, and a buffer arranged transversely of the vehicle in front of said levers and connected with each of the latter.

4. A fender or guard for vehicles provided with cylinders supported at the opposite sides of the front of the vehicle, plungers operating through the front end portions of said cylinders, springs placed in said cylinders and in connection with which said plungers operate, vertical supports arranged forwardly of said cylinders, spring operated side wings connected with said supports, dogs connected with said wings and adapted to engage said plungers in said cylinders, a buffer bar mounted transversely of the front of the vehicle and in front of said cylinders, and devices connected with said bar and said plungers and adapted to operate the latter and release said dogs when pressure is applied to said buffer bar.

5. A fender or guard for vehicles comprising cylinders supported at the opposite sides of the front of the vehicle, spring operated plungers movable in said cylinders and operating through the front ends thereof, spring operated side wings hinged adjacent to said cylinders, dogs connected with said wings and adapted to engage said plungers and hold them in their innermost position in said cylinders, and a buffer device mounted transversely of the front of the vehicle and in operative connection with said plungers, and adapted, when pressure is applied thereto, to force said plungers inwardly and release said dogs.

6. A fender or guard for vehicles comprising vertical supports arranged at the opposite sides of the front of the vehicle, spring operated wings mounted on said supports, spring operated dogs connected with said wings, devices mounted at the opposite sides of the vehicle and in connection with which said dogs operate to hold said wings in an open position, a buffer mounted transversely of the front of the vehicle, and devices connected with said buffer and adapted to operate when pressure is applied thereto to release said dogs.

7. A fender or guard for vehicles comprising spring operated wings mounted at the opposite sides of the front of the vehicle, a buffer extending transversely of the front of the vehicle, cylinders arranged at the opposite sides of the vehicle, spring operated plungers mounted in said cylinders and movable through the front ends thereof, dogs connected with said wings and adapted to engage said plungers in said cylinders, and means connected with said buffer and with said plungers whereby pressure applied to the buffer will force said plungers inwardly and release said dogs.

8. The combination with the front of a vehicle of a fender or guard comprising spring operated side wings, a buffer mounted transversely of the front of the vehicle, spring controlled plungers mounted at the opposite sides of said vehicle and in operative connection with said buffer, and devices connected with said spring controlled wings for engaging said plungers, said wings being adapted to be normally held in an open position and to be thrown forwardly and closed by pressure applied to the buffer.

In testimony that I claim the foregoing as my invention I have signed my name in presence of the subscribing witnesses this 16th day of October 1913.

JOSEPH CORCOS.

Witnesses:
C. MULREANY,
F. ANDREWS.